US012569829B2

(12) United States Patent
Liu et al.

(10) Patent No.: US 12,569,829 B2
(45) Date of Patent: Mar. 10, 2026

(54) CATALYSTS FOR GASOLINE ENGINE EXHAUST GAS TREATMENTS

(71) Applicant: Johnson Matthey Public Limited Company, London (GB)

(72) Inventors: Dongxia Liu, Wayne, PA (US); Michael Howard, Wayne, PA (US); Kevin Kistler, Wayne, PA (US)

(73) Assignee: JOHNSON MATTHEY PUBLIC LIMITED COMPANY, London (GB)

( * ) Notice: Subject to any disclaimer, the term of this patent is extended or adjusted under 35 U.S.C. 154(b) by 361 days.

(21) Appl. No.: 18/165,963

(22) Filed: Feb. 8, 2023

(65) Prior Publication Data

US 2023/0249157 A1      Aug. 10, 2023

Related U.S. Application Data

(60) Provisional application No. 63/267,818, filed on Feb. 10, 2022.

(51) Int. Cl.
B01J 21/04          (2006.01)
B01D 53/94          (2006.01)
(Continued)

(52) U.S. Cl.
CPC .......... B01J 21/04 (2013.01); B01D 53/9418 (2013.01); B01J 21/066 (2013.01); B01J 23/63 (2013.01);
(Continued)

(58) Field of Classification Search
CPC ... B01J 21/04; B01J 23/10; B01J 35/50; B01J 35/56; B01J 35/57; B01J 53/9418; B01J 21/066; B01J 23/63; B01J 2523/3706; B01J 2523/3712; B01J 2523/822; B01J 2523/828; B01J 23/464; B01J 35/19; B01D 53/9418; B01D 2255/1021; B01D 2255/1025; B01D 2255/2063; B01D 2255/2065; B01D 2255/20715; B01D 2255/2092; B01D 2257/40;
(Continued)

(56) References Cited

U.S. PATENT DOCUMENTS 6,159,897 A * 12/2000 Suzuki ..................... B01J 23/58
                                                              502/328
6,958,427 B2 * 10/2005 Park ...................... C07C 5/3332
                                                              585/444
(Continued)

FOREIGN PATENT DOCUMENTS

EP            2579983 B1       3/2018
WO      2010012677 A1      2/2010
(Continued)

*Primary Examiner* — Cam N. Nguyen
(74) *Attorney, Agent, or Firm* — Ni Yan

(57)          ABSTRACT
A three-way catalyst article, and its use in an exhaust system for internal combustion engines, is disclosed. The catalyst article for treating exhaust gas comprising: a substrate comprising an inlet end and an outlet end with an axial length L; a first catalytic region comprising a first platinum group metal (PGM) component supported on a first PGM support material, wherein the first PGM component comprises platinum and rhodium; and wherein the first PGM support material comprises $ZrO_2$—$Al_2O_3$.

20 Claims, 9 Drawing Sheets

Inlet

Outlet $1^{st}$ Catalytic Region

Substrate Wall

(51) Int. Cl.
*B01J 21/06* (2006.01)
*B01J 23/10* (2006.01)
*B01J 23/63* (2006.01)

(52) U.S. Cl.
CPC ................ *B01D 2255/1021* (2013.01); *B01D 2255/1025* (2013.01); *B01D 2255/2063* (2013.01); *B01D 2255/2065* (2013.01); *B01D 2255/20715* (2013.01); *B01D 2255/2092* (2013.01); *B01D 2257/40* (2013.01); *B01D 2258/01* (2013.01); *B01J 2523/3706* (2013.01); *B01J 2523/3712* (2013.01); *B01J 2523/822* (2013.01); *B01J 2523/828* (2013.01)

(58) Field of Classification Search
CPC ............ B01D 2258/01; B01D 2255/40; B01D 2255/9022; B01D 2255/908; B01D 2258/014; B01D 53/9445; F01N 3/101; F01N 2510/068; Y02A 50/20; Y02T 10/12
USPC ........ 502/304, 332–334, 339, 355, 415, 439
See application file for complete search history.

(56) References Cited

U.S. PATENT DOCUMENTS

| | | | | |
|---|---|---|---|---|
| 7,276,212 B2 * | 10/2007 | Hu | B01J 37/0244 | |
| | | | 422/177 | |
| 7,374,729 B2 * | 5/2008 | Chen | B01J 37/0248 | |
| | | | 422/177 | |
| 7,501,098 B2 * | 3/2009 | Chen | B01D 53/945 | |
| | | | 422/177 | |
| 7,550,124 B2 * | 6/2009 | Chen | F01N 13/0097 | |
| | | | 422/177 | |
| 7,758,834 B2 * | 7/2010 | Chen | F01N 13/0097 | |
| | | | 60/299 | |
| 8,828,343 B2 * | 9/2014 | Liu | B01J 23/63 | |
| | | | 502/262 | |
| 8,833,064 B2 * | 9/2014 | Galligan | B01J 21/066 | |
| | | | 502/262 | |
| 10,512,898 B2 * | 12/2019 | Deeba | B01J 23/63 | |
| 10,773,209 B2 * | 9/2020 | Liu | B01J 37/0248 | |
| 11,131,225 B2 * | 9/2021 | Liu | B01J 23/464 | |
| 11,260,372 B2 * | 3/2022 | Xue | B01D 53/9418 | |
| 11,904,299 B2 * | 2/2024 | Zheng | B01D 53/9477 | |
| 11,982,218 B2 * | 5/2024 | Sung | B01J 23/02 | |
| 12,055,083 B2 * | 8/2024 | Liu | B01J 23/464 | |
| 12,172,149 B2 * | 12/2024 | Howard | F01N 3/2803 | |
| 12,253,015 B2 * | 3/2025 | Vjunov | B01J 35/19 | |
| 2008/0219906 A1 | 9/2008 | Chen et al. | | |
| 2013/0108530 A1 | 5/2013 | Chang et al. | | |
| 2019/0240643 A1 * | 8/2019 | Karpov | B01J 37/0248 | |
| 2020/0271031 A1 * | 8/2020 | Chen | F01N 13/009 | |
| 2022/0134314 A1 | 5/2022 | Howard et al. | | |
| 2022/0136417 A1 | 5/2022 | Millington et al. | | |
| 2022/0161236 A1 * | 5/2022 | Vjunov | B01J 37/0036 | |
| 2022/0193639 A1 * | 6/2022 | Vjunov | B01D 53/9477 | |
| 2022/0212170 A1 * | 7/2022 | Sung | B01J 23/42 | |
| 2022/0212178 A1 * | 7/2022 | Liu | F01N 3/2842 | |
| 2023/0016066 A1 * | 1/2023 | Sun | B01D 53/9468 | |
| 2023/0129600 A1 * | 4/2023 | Zheng | B01J 37/0203 | |
| | | | 502/171 | |
| 2023/0143941 A1 * | 5/2023 | Chandler | B01D 53/945 | |
| | | | 423/213.5 | |
| 2023/0147850 A1 * | 5/2023 | Aleksei | B01J 23/10 | |
| | | | 423/213.5 | |
| 2023/0338938 A1 * | 10/2023 | Vjunov | B01J 37/0236 | |
| 2023/0338940 A1 * | 10/2023 | Sung | B01J 37/0219 | |

FOREIGN PATENT DOCUMENTS

| | | | |
|---|---|---|---|
| WO | 2010096612 A2 | 8/2010 | |
| WO | 2012/029050 A1 | 3/2012 | |
| WO | 2020190994 A1 | 9/2020 | |
| WO | 2021/102391 A1 | 5/2021 | |

* cited by examiner

FIG. 1

Inlet                  Outlet

| 1st Catalytic Region |
| Substrate Wall |

FIG. 2a

Inlet                  Outlet

| 2nd Catalytic Region |
| 1st Catalytic Region |
| Substrate Wall |

FIG. 2b

Inlet                  Outlet

| 1st Catalytic Region |
| 2nd Catalytic Region |
| Substrate Wall |

Inlet

Outlet

1ˢᵗ Catalytic Region

3ʳᵈ Catalytic Region

2ⁿᵈ Catalytic Region

Substrate Wall

Inlet

Outlet

3ʳᵈ Catalytic Region

1ˢᵗ Catalytic Region

2ⁿᵈ Catalytic Region

Substrate Wall

Inlet

Outlet

3ʳᵈ Catalytic Region

2ⁿᵈ Catalytic Region

1ˢᵗ Catalytic Region

Substrate Wall

Inlet

Outlet

Inlet

Outlet

CATALYSTS FOR GASOLINE ENGINE EXHAUST GAS TREATMENTS

FIELD OF THE INVENTION

The present invention relates to a catalyzed article useful in treating exhaust gas emissions from gasoline engines.

BACKGROUND OF THE INVENTION

Internal combustion engines produce exhaust gases containing a variety of pollutants, including hydrocarbons (HCs), carbon monoxide (CO), and nitrogen oxides ("NO$_x$"). Emission control systems, including exhaust gas catalytic conversion catalysts, are widely utilized to reduce the amount of these pollutants emitted to atmosphere. A commonly used catalyst for gasoline engine exhaust treatments is the TWC (three way catalyst). TWCs perform three main functions: (1) oxidation of CO; (2) oxidation of unburnt HCs; and (3) reduction of NO$_x$.

Improving fuel economy becomes more and more important driven by the market demand as well as the stringent emission control regulations. Deceleration fuel shut off (DFSO) has been adopted by all OEMs as a primary fuel saving approach. In a typical DFSO event, fuel injection is either completely stopped or substantially reduced during deceleration or high-speed cruise, while the air intake is still remained. The engine pumps air over the very hot catalyst and oxidizes it, disabling its ability to convert NO$_x$. When the fuel comes back on, the engine runs rich to reduce the catalyst surface to aid in NO$_x$ conversion. However, only a very short rich excursion with a limited number of reductants come from the engine, the outlet of close coupled ("CC") brick and the entire under floor ("UF") brick are not reduced enough. There is some NO$_x$ break through during this short rich recovery stage. In addition, rich recovery after fuel cut also generates NH$_3$. The NH$_3$ from the CC catalyst can be oxidized back to NO$_x$ over the UF catalyst over the Pd sites. Overall result is NO$_x$ spike after each fuel cut event.

NO$_x$ emission reduction on gasoline vehicles beyond the cold start stage becomes elevated when OEMs use aggressive DFSO strategies and start/stop technology to meet their fuel economy objectives. A catalyst solution is desired that can enable OEMs to meet their fuel economy targets by using DFSO and start/stop and also meet low criteria emissions limits. This invention addresses this need.

SUMMARY OF THE INVENTION

One aspect of the present disclosure is directed to a catalytic article for treating exhaust gas comprising: a substrate comprising an inlet end and an outlet end with an axial length L; a first catalytic region comprising a first platinum group metal (PGM) component supported on a first PGM support material, wherein the first PGM component comprises platinum and rhodium; and wherein the first PGM support material comprises ZrO$_2$—Al$_2$O$_3$.

The invention also encompasses an exhaust system for internal combustion engines that comprises the three-way catalyst component of the invention.

The invention also encompasses treating an exhaust gas from an internal combustion engine, in particular for treating exhaust gas from a gasoline engine. The method comprises contacting the exhaust gas with the three-way catalyst component of the invention.

BRIEF DESCRIPTION OF THE DRAWINGS

FIG. 1 shows one embodiment according to the present invention, which contains first catalytic region with a length of 100% to the axial length L of the substrate (single layer).

FIG. 2a shows one embodiment according to the present invention, the first catalytic region extends 100% of the axial length L, as bottom layer; the second catalytic region extends 100% of the axial length L, as top layer. FIG. 2b depicts a variation of FIG. 2a.

FIG. 3b depicts a variation of FIG. 3a.

FIG. 3d depicts a variation of FIG. 3c.

FIG. 4a shows one embodiment according to the present invention, the first catalytic region extends less than 100% of the axial length L, from the inlet end; the second catalytic region extends less than 100% of the axial length L, from the outlet end. The total length of the second and the first catalytic region is less than or equal to the axial length L. The 3$^{rd}$ catalytic region extends 100% of the axial length L and overlies the first and second catalytic regions as top layer. FIG. 4b depicts a variation of FIG. 4a.

FIG. 4c shows one embodiment according to the present invention, the 3$^{rd}$ catalytic region extends 100% of the axial length L as bottom layer. The first catalytic region extends less than 100% of the axial length L, from the inlet end; the second catalytic region extends less than 100% of the axial length L, from the outlet end. The total length of the second and the first catalytic region is less than or equal to the axial length L.

FIGS. 5b and 5c depict variations of FIG. 5a.

FIG. 6a shows one embodiment according to the present invention, the first catalytic region extends less than 100% of the axial length L, from the inlet end; the second catalytic region extends less than 100% of the axial length L, from the outlet end. The total length of the second and the first catalytic region is greater than the axial length L. The 3$^{rd}$ catalytic region extends 100% of the axial length L and overlies the first and second catalytic regions as top layer. FIGS. 6b-6f depict variations of FIG. 6a.

FIG. 6g shows one embodiment according to the present invention, the first catalytic region extends less than 100% of the axial length L, from the inlet end; the second catalytic region extends less than 100% of the axial length L, from the outlet end. The total length of the second and the first catalytic region can be less than, equal to, or greater than the axial length L. The 3$^{rd}$ catalytic region extends less than 100% of the axial length L from the inlet end and at least partially overlies the first and/or second catalytic regions.

DETAILED DESCRIPTION OF THE INVENTION

Figure 3A:
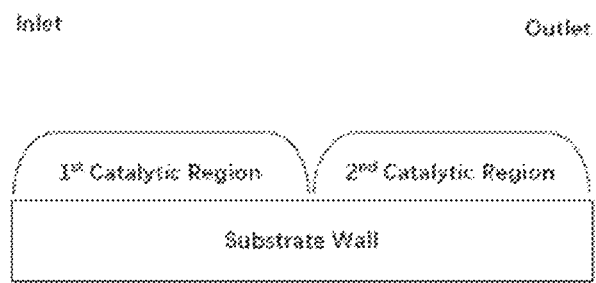
FIG. 3a shows one embodiment according to the present invention, the first catalytic region extends less than 100% of the axial length L, from the inlet end; the second catalytic region extends less than 100% of the axial length L, from the outlet end. The total length of the second and the first catalytic region is equal or less than the axial length L.
Figure 3B:
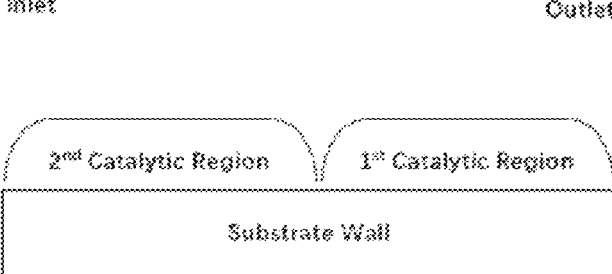

Although, DFSO measure has been deployed by OEMs to improve their fuel economy for decades, $NO_x$ breakthrough during the rich recovery stage after DFSO still has not been addressed successfully, making $NO_x$ accumulative beyond cold start period a vast majority to the tailpipe emissions. Current catalytic solutions focus on temporary storage of the $NO_x$ slip with additional Ba and support materials (such as $CeO_2$) borrowed from diesel $NO_x$ trap (NT) concept. However, the $NO_x$ storage window on Ba species/$CeO_2$ is much lower than typical TWC applications, which substantially decreases, if not completely loses, the storage capacity of TWC+NT. The inventors have surprisingly discovered that Pt and Rh supported on $ZrO_2$—$Al_2O_3$ can effectively reduce $NO_x$ slip after fuel cut events without negatively impacting the light-off functions.

One aspect of the present disclosure is directed to a catalytic article for treating exhaust gas comprising: a substrate comprising an inlet end and an outlet end with an axial length L; a first catalytic region comprising a first platinum group metal (PGM) component supported on a first PGM support material, wherein the first PGM component comprises platinum and rhodium; and wherein the first PGM support material comprises $ZrO_2$—$Al_2O_3$.

First Catalytic Region $ZrO_2$—$Al_2O_3$ can be a composite oxide or a mixed oxide. In some embodiments, the $ZrO_2$—$Al_2O_3$ can contain up to 50 wt. % $ZrO_2$. In other embodiments, the $ZrO_2$—$Al_2O_3$ can contain from 1 wt. % to 50 wt. % $ZrO_2$; from 2 wt. % to 40 wt. % $ZrO_2$; from 3 wt. % to 30 wt. % $ZrO_2$; or from 5 wt. % to 20 wt. % $ZrO_2$. In yet other embodiments, the $ZrO_2$—$Al_2O_3$ can contain from 5 wt. % to 50 wt. % $ZrO_2$; from 10 wt. % to 45 wt. % $ZrO_2$; from 10 wt. % to 40 wt. % $ZrO_2$; from 10 wt. % to 30 wt. % $ZrO_2$; or from 10 wt. % to 20 wt. % $ZrO_2$.

In certain embodiments, the $ZrO_2$—$Al_2O_3$ can be doped with a suitable dopant, such as La, Mn, Ni, Ti, or Cu; more preferably, the $ZrO_2$—$Al_2O_3$ can be doped with La. In further embodiments, the $ZrO_2$—$Al_2O_3$ can be doped with 1-15 wt. % La, the weight is based on lanthana.

In some embodiments, the $ZrO_2$—$Al_2O_3$ can be substantially free of Ce, preferably, essentially free of Ce.

The first PGM component can be selected from the group consisting of platinum, palladium, rhodium, and a mixture thereof. In some embodiments, the first PGM component can be Pd, Rh or a mixture thereof. In other embodiments, the first PGM component can be Pt, Rh or a mixture thereof. In certain embodiments, the first PGM component can have a Pt/Rh weight ratio of 20:1 to 1:20, 15:1 to 1:15, 10:1 to 1:10, 5:1 to 1:5, or 2:1 to 1:2. In certain embodiments, the first catalytic region further comprises Pd. In other embodiments, the total PGM loading in the first catalytic region can be up to 50 g/ft³, up to 40 g/ft³, up to 30 g/ft³, up to 20 g/ft³, or up to 15 g/ft³. Alternatively, the PGM loading of the first catalytic region can be 1 g/ft³ to 50 g/ft³, 2 g/ft³ to 40 g/ft³, 2 g/ft³ to 30 g/ft³, 2 g/ft³ to 20 g/ft³, 2 g/ft³ to 15 g/ft³, or 2 g/ft³ or 10 g/ft³.

The first PGM component is supported on the first PGM support material, such as $ZrO_2$—$Al_2O_3$. The PGMs may be supported on the surface and/or within the pores of the $ZrO_2$—$Al_2O_3$.

In certain embodiments, the first catalytic region can further comprise a first oxygen storage capacity (OSC) material. In some embodiments, the first PGM component is not supported on the first OSC material. Alternatively, the first OSC material is substantially free of the first PGM component; preferably, essentially free of the first PGM component.

The first OSC material can be cerium oxide, zirconium oxide, a ceria-zirconia mixed oxide, an alumina-ceria-zirconia mixed oxide, or a combination thereof. More preferably, the first OSC material comprises the ceria-zirconia mixed oxide, the alumina-ceria-zirconia mixed oxide or a combination thereof. The ceria-zirconia mixed oxide can further comprise dopants, such as lanthanum, neodymium, praseodymium, yttrium oxides, etc. In some embodiments, the first OSC material comprises the ceria-zirconia mixed oxide and the alumina-ceria-zirconia mixed oxide.

In some embodiments, the first catalytic region is substantially free of a first alkali or alkaline earth metal; preferably, essentially free of the first alkali or alkaline earth metal (such as Ba).

As demonstrated in the Examples below, the catalyst article in this aspect can be applied as a TWC catalyst for treating exhaust gas produced by gasoline engines.

The first catalytic region can extend for 100 percent of the axial length L. (E.g., see FIGS. 1, 2*a*, 2*b*, and 5*a*-5*c*). In some embodiments, the first catalytic region can extend for 20 to 99%, 30 to 90%, or 40-80% of the axial length L. Alternatively, the first catalytic region can extend for 30 to 70 percent of the axial length L. Preferably, for 40 to 60 percent, more preferably, 45 to 55 percent of the axial length L, (E.g., see FIGS. 3*a*-5*d* and 6*a*-6*l*).

The total washcoat loading of the first catalytic region can be less than 3.5 g/in³; preferably, less than 3.0 g/in³ or 2.5 g/in³. Alternatively, the total washcoat loading of the first catalytic region can be from 0.5 to 3.5 g/in³; preferably, can be from 0.6 to 3 g/in³ or 0.7 to 2.5 g/in³.

Second Catalytic Region

The catalytic article may further comprise a second catalytic region.

The second catalytic region can further comprise a second PGM component, a second oxygen storage capacity (OSC) material, a second alkali or alkaline earth metal component, and/or a second inorganic oxide.

The second PGM component can be selected from the group consisting of platinum, palladium, rhodium, and a mixture thereof. In some embodiments, the second PGM component can be Pd, Rh or a mixture thereof.

The second OSC material can be cerium oxide, zirconium oxide, a ceria-zirconia mixed oxide, an alumina-ceria-zirconia mixed oxide, or a combination thereof. More preferably, the second OSC material comprises the ceria-zirconia mixed oxide, the alumina-ceria-zirconia mixed oxide, or a combination thereof. In addition, the second OSC material may further comprise one or more of dopants like lanthanum, neodymium, praseodymium, yttrium etc. Moreover, the second OSC material may have the function as a support material for the second PGM component. In some embodiments, the second OSC material comprises the ceria-zirconia mixed oxide and the alumina-ceria-zirconia mixed oxide.

The ceria-zirconia mixed oxide can have a weight ratio of zirconia to ceria at least 50:50; preferably, higher than 60:40; more preferably, higher than 70:30. Alternatively, the ceria-zirconia mixed oxide also can have a weight ratio of ceria to zirconia less than 50:50, preferably, less than 40:60, more preferably, less than 30:70.

The second OSC material (e.g., ceria-zirconia mixed oxide) can be from 10 to 90 wt. %; preferably, 25-75 wt. %; more preferably, 30-60 wt. %, based on the total washcoat loading of the second catalytic region.

The second OSC material loading in the second catalytic region can be less than 2 $g/in^3$. In some embodiments, the second OSC material loading in the second catalytic region is no greater than 1.5 $g/in^3$, 1.2 $g/in^3$, 1 $g/in^3$, 0.8 $g/in^3$, or 0.7 $g/in^3$.

The second alkali or alkaline earth metal is preferably barium, strontium, mixed oxides or composite oxides thereof. Preferably the barium or strontium, where present, is in an amount of 0.1 to 15 wt. %, and more preferably 3 to 10 wt. % of barium or strontium, based on the total weight of the second catalytic region.

It is even more preferable that the second alkali or alkaline earth metal is strontium. The strontium, where present, is preferably present in an amount of 0.1 to 15 wt. %, and more preferably 3 to 10 wt. %, based on the total weight of the second catalytic region.

It is also preferable that the second alkali or alkaline earth metal is mixed oxides or composite oxide of barium and strontium. Preferably, the mixed oxides or composite oxide of barium and strontium is present in an amount of 0.1 to 15 wt. %, and more preferably 3 to 10 wt. %, based on the total weight of the second catalytic region. It is more preferable that the second alkali or alkaline earth metal is composite oxide of barium and strontium.

Preferably the barium or strontium is present as $BaCO_3$ or $SrCO_3$. Such a material can be performed by any method known in the art, for example incipient wetness impregnation or spray-drying.

The second inorganic oxide is preferably an oxide of Groups 2, 3, 4, 5, 13 and 14 elements. The second inorganic oxide is preferably selected from the group consisting of alumina, magnesia, silica, zirconia, barium oxides, and mixed oxides or composite oxides thereof. Particularly preferably, the second inorganic oxide is alumina, lanthanum-alumina, zirconia, or a magnesia/alumina composite oxide. One especially preferred second inorganic oxide is alumina or lanthanum-alumina.

The second OSC material and the second inorganic oxide can have a weight ratio of no greater than 10:1; preferably, no greater than 8:1 or 5:1; more preferably, no greater than 4:1 or 3:1; most preferably, no greater than 2:1.

Alternatively, the second OSC material and the second inorganic oxide can have a weight ratio of 10:1 to 1:10; preferably, 8:1 to 1:8 or 5:1 to 1:5; more preferably, 4:1 to 1:4 or 3:1 to 1:3; and most preferably, 2:1 to 1:2.

In some embodiments, the second OSC material and the second inorganic oxide can have a weight ratio of no less than 2:1. In further embodiments, the second OSC material and the second inorganic oxide can have a weight ratio of no less than 10:1. In another further embodiments, the second OSC material and the second inorganic oxide can have a weight ratio of no less than 20:1 or no less than 30:1. In yet another further embodiments, the second OSC material and the second inorganic oxide can have a weight ratio of no less than 40:1 or no less than 50:1.

The total washcoat loading of the second catalytic region can be less than 3.5 $g/in^3$; preferably, less than 3.0 $g/in^3$ or 2.5 $g/in^3$. Alternatively, the total washcoat loading of the first catalytic region can be from 0.5 to 3.5 $g/in^3$; preferably, can be from 0.6 to 3 $g/in^3$ or 0.7 to 2.5 $g/in^3$.

The second catalytic region can extend for 100 percent of the axial length L. (E.g., see FIGS. 2a, 2b, and 5a-5c)

The second catalytic region can extend for 30 to 70 percent of the axial length L. Preferably, for 40 to 60 percent, more preferably, 45 to 55 percent of the axial length L. and most preferably, the total length of the second region and the first region is equal or greater than the axial length L (E.g., see FIGS. 3a-4d and 6a-6l).

Figure 3C:
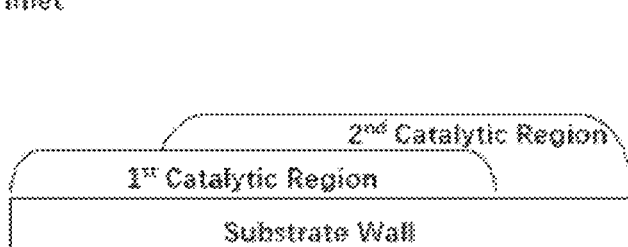
FIG. 3c shows one embodiment according to the present invention, the first catalytic region extends less than 100% of the axial length L, from the inlet end; the second catalytic region extends less than 100% of the axial length L, from the outlet end. The total length of the second and the first catalytic region is greater than the axial length L.
Figures 3D, 4A, 4B, 4C:
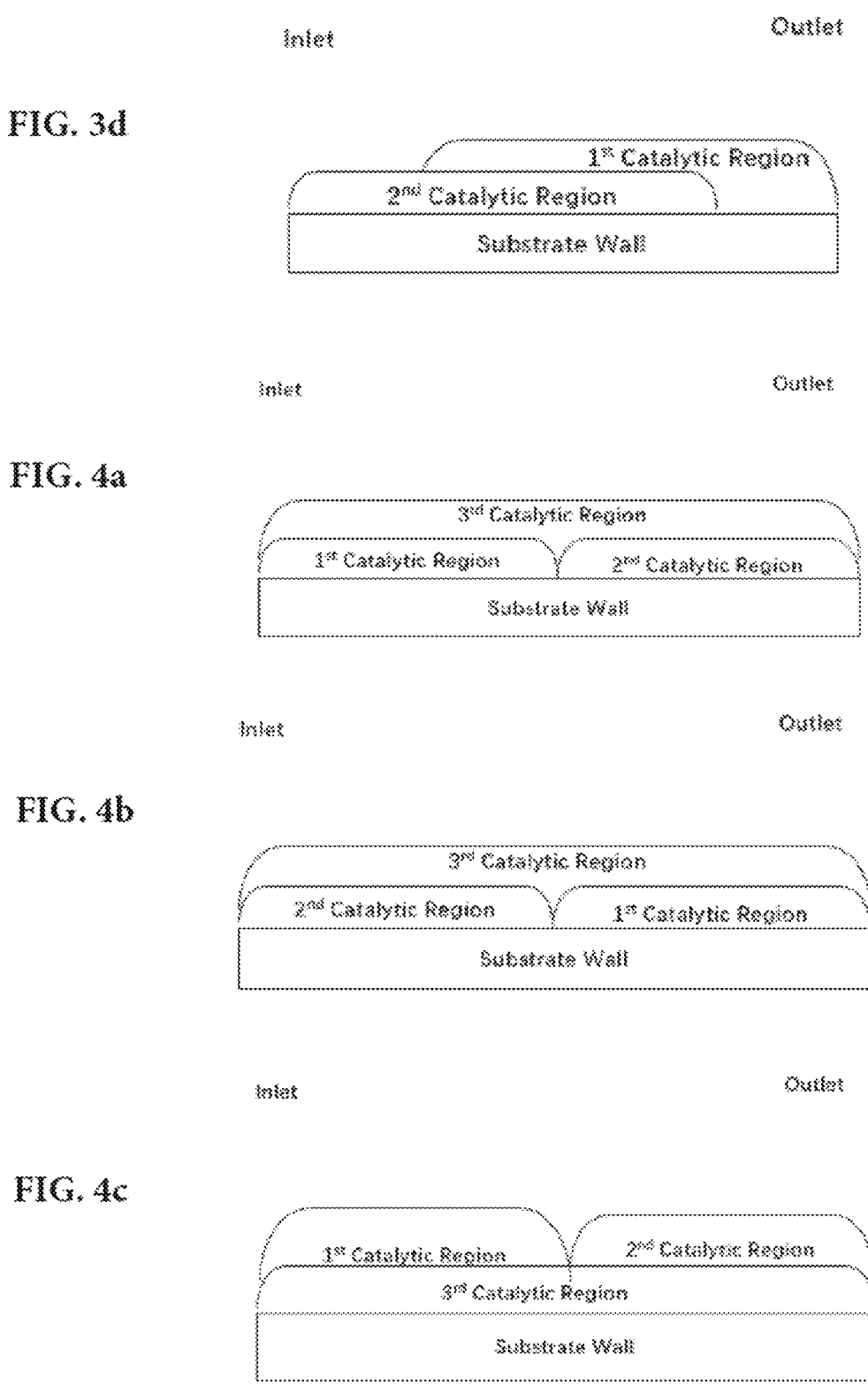
Figure 4D:
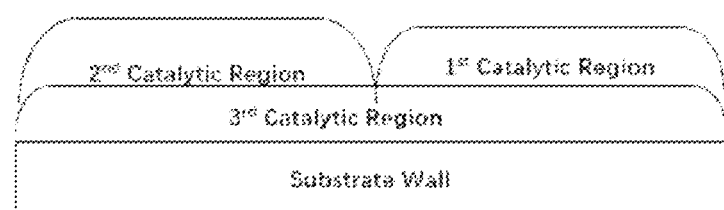
FIG. 4d depicts a variation of FIG. 4c.
Figure 5A:
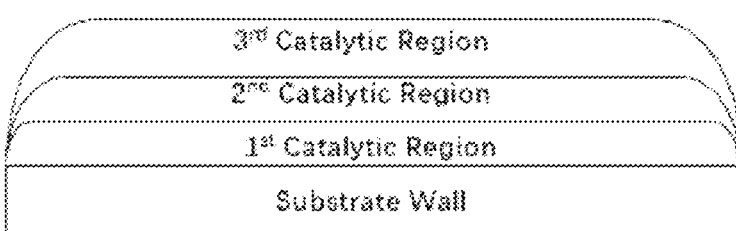
FIG. 5a shows one embodiment according to the present invention, the first catalytic region extends 100% of the axial length L, as bottom layer; the second catalytic region extends 100% of the axial length L, as middle layer; and the third catalytic region extends 100% of the axial length L, as top layer.
Figure 5B:
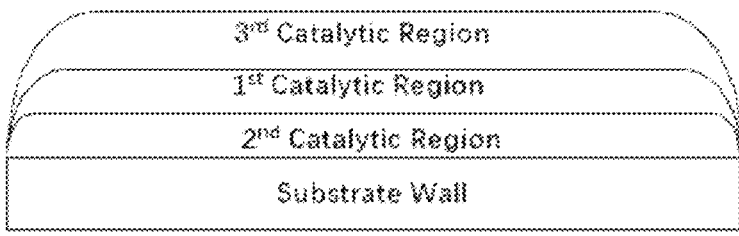
Figures 5C, 6A, 6B:
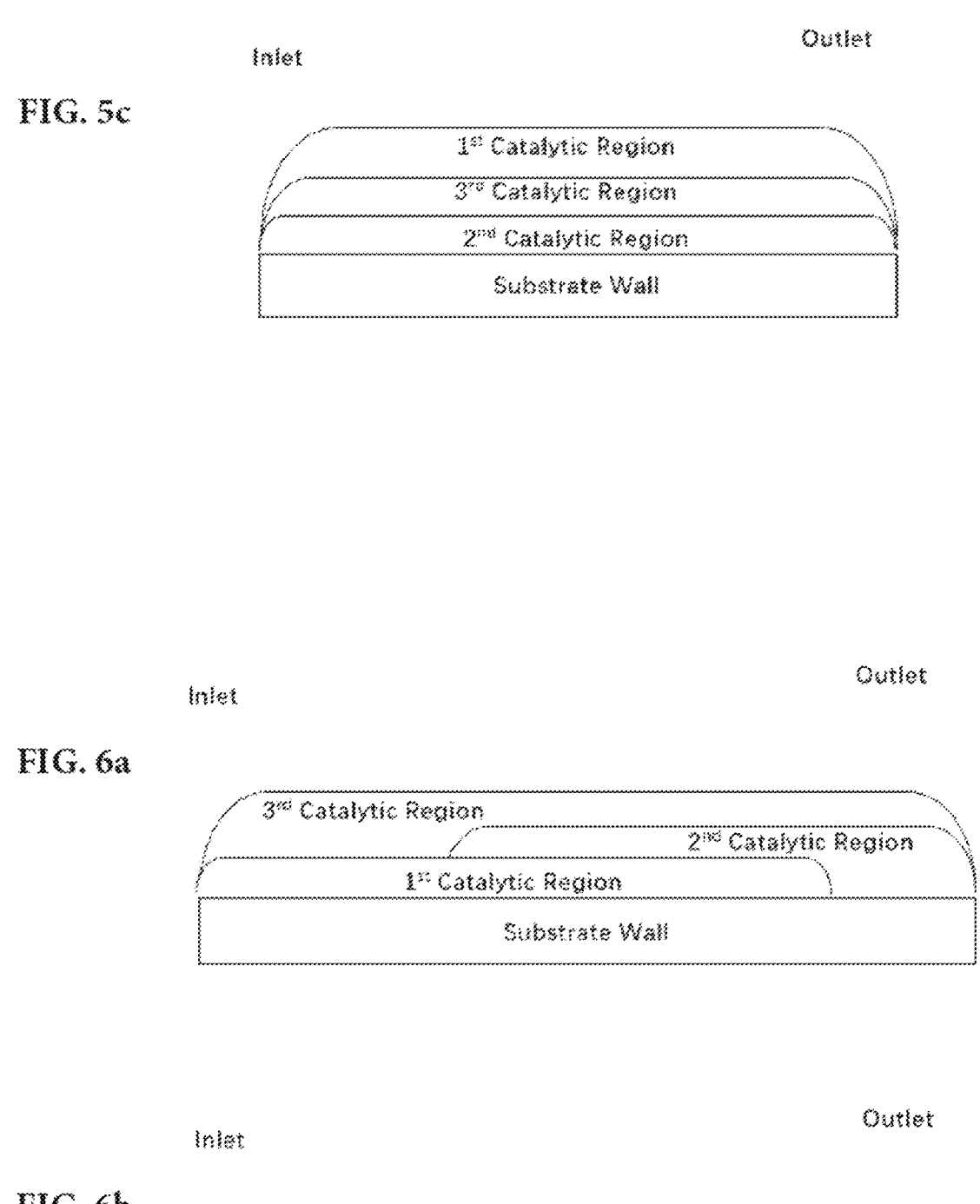
Figures 6C, 6D, 6E:
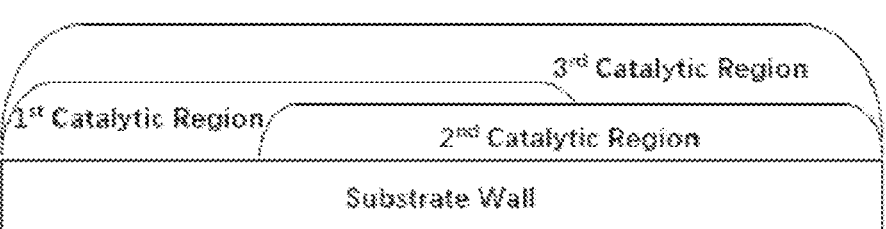
Figures 6F, 6G:
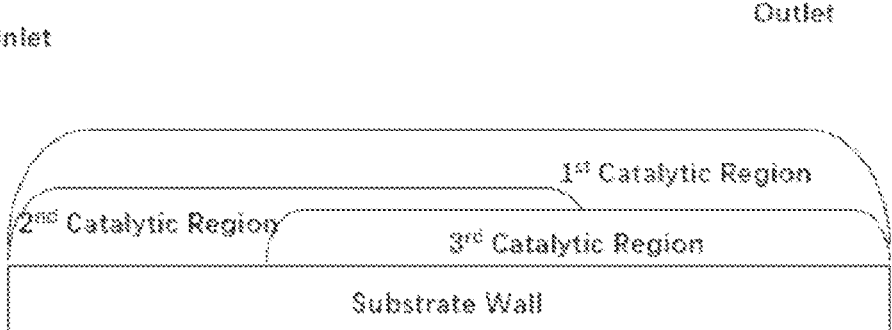
Figures 6H, 6I, 6J:
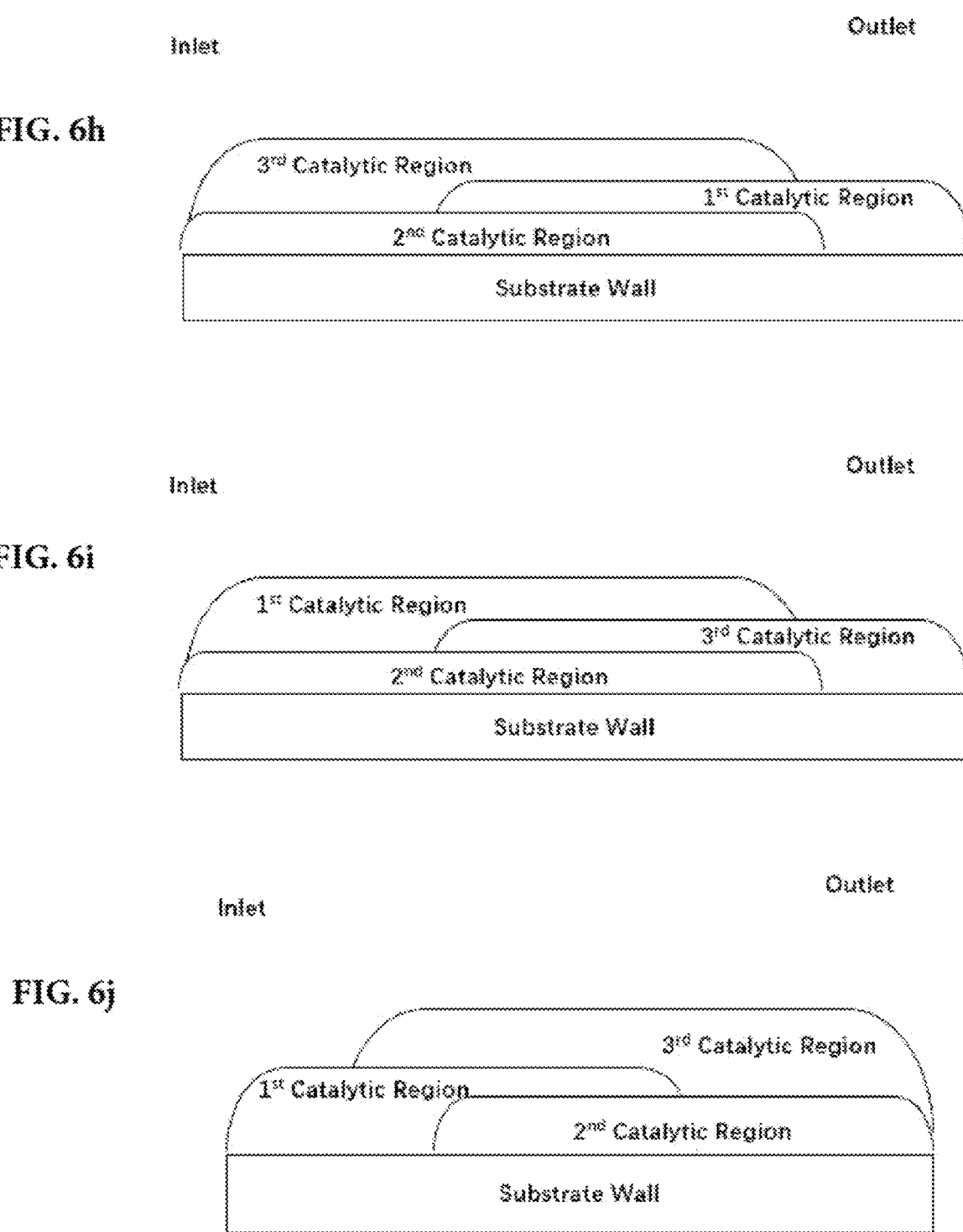
FIGS. 6h and 6i depict variations of FIG. 6g.
FIG. 6*j* shows one embodiment according to the present invention, the first catalytic region extends less than 100% of the axial length L, from the inlet end; the second catalytic region extends less than 100% of the axial length L, from the outlet end. The total length of the second and the first catalytic region can be less than, equal to, or greater than the axial length L. The $3^{rd}$ catalytic region extends less than 100% of the axial length L from the outlet end and at least partially overlies the second and/or first catalytic regions.
Figure 6K:
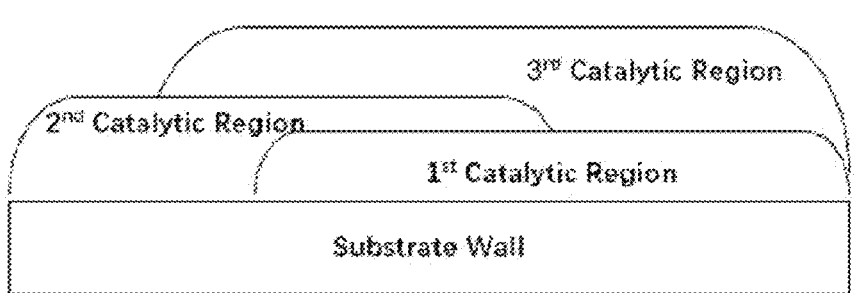
FIGS. 6*k* and 6*l* depict variations of FIG. 6*j*.
Figure 6L:
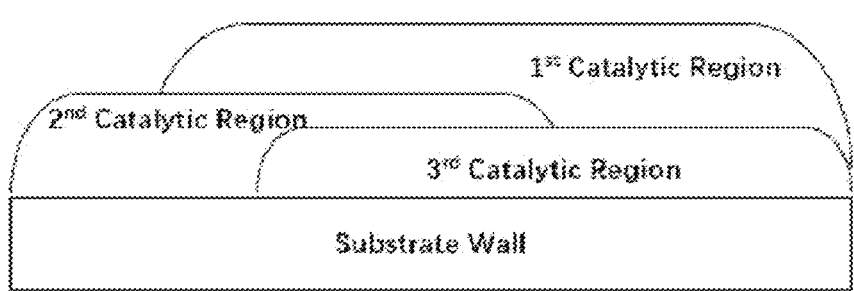

The second catalytic region can overlap with the first catalytic region for 0.1 to 99 percent of the axial length L (e.g., see FIGS. 3c and 3d, the first catalytic region can overlie the second catalytic region or the second catalytic region can overlie the first catalytic region). Alternatively, the total length of the second catalytic region and the first catalytic region can equal to the axial length L (e.g., see FIGS. 3a and 3b). In yet another alternative, total the length of the second catalytic region and the first catalytic region can be less than the axial length L, for example, no greater than 95%, 90%, 80%, or 70% of the axial length L.

In some embodiments, the first catalytic region can be supported/deposited directly on the substrate. In certain embodiments, the second catalytic region can be supported/deposited directly on the substrate.

Third Catalytic Region

The catalytic article may further comprise a third catalytic region.

The third catalytic region can further comprise a third PGM component, a third oxygen storage capacity (OSC) material, a third alkali or alkaline earth metal component, and/or a third inorganic oxide.

The third PGM component can be selected from the group consisting of platinum, palladium, rhodium, and a mixture thereof. In some embodiments, the third PGM component can be Pd, Rh or a mixture thereof.

The third OSC material can be cerium oxide, zirconium oxide, a ceria-zirconia mixed oxide, an alumina-ceria-zirconia mixed oxide, or a combination thereof. More preferably, the third OSC material comprises the ceria-zirconia mixed oxide, the alumina-ceria-zirconia mixed oxide, or a combination thereof. In addition, the third OSC material may further comprise one or more of dopants like lanthanum, neodymium, praseodymium, yttrium etc. Moreover, the third OSC material may have the function as a support material for the third PGM component. In some embodiments, the third OSC material comprises the ceria-zirconia mixed oxide and the alumina-ceria-zirconia mixed oxide.

The ceria-zirconia mixed oxide can have a weight ratio of zirconia to ceria at least 50:50; preferably, higher than 60:40; more preferably, higher than 75:25. Alternatively, the ceria-zirconia mixed oxide also can have a weight ratio of ceria to zirconia less than 50:50; preferably, less than 40:60; more preferably, less than 25:75.

The third OSC material (e.g., ceria-zirconia mixed oxide) can be from 10 to 90 wt. %; preferably, 25-75 wt. %; more preferably, 30-60 wt. %, based on the total washcoat loading of the third catalytic region.

The third OSC material loading in the third catalytic region can be less than 1.5 $g/in^3$. In some embodiments, the third OSC material loading in the second catalytic region is no greater than 1.2 g/in$^3$, 1.0 g/in$^3$, 0.9 g/in$^3$, 0.8 g/in$^3$, or 0.7 g/in$^3$.

The total washcoat loading of the third catalytic region can be less than 3.5 g/in$^3$; preferably, no more than 3.0 g/in$^3$, 2.5 g/in$^3$, or 2 g/in$^3$.

The third alkali or alkaline earth metal is preferably barium, strontium, mixed oxides or composite oxides thereof. Preferably the barium or strontium, where present, is in an amount of 0.1 to 15 wt. %, and more preferably 3 to 10 wt. % of barium or strontium, based on the total weight of the third catalytic region.

It is even more preferable that the third alkali or alkaline earth metal is strontium. The strontium, where present, is preferably present in an amount of 0.1 to 15 wt. %, and more preferably 3 to 10 wt. %, based on the total weight of the third catalytic region.

It is also preferable that the third alkali or alkaline earth metal is mixed oxides or composite oxide of barium and strontium. Preferably, the mixed oxides or composite oxide of barium and strontium is present in an amount of 0.1 to 15 wt. %, and more preferably 3 to 10 wt. %, based on the total weight of the third catalytic region. It is more preferable that the third alkali or alkaline earth metal is composite oxide of barium and strontium.

Preferably the barium or strontium is present as BaCO$_3$ or SrCO$_3$. Such a material can be performed by any method known in the art, for example incipient wetness impregnation or spray-drying.

The third inorganic oxide is preferably an oxide of Groups 2, 3, 4, 5, 13 and 14 elements. The third inorganic oxide is preferably selected from the group consisting of alumina, magnesia, silica, zirconia, barium oxides, and mixed oxides or composite oxides thereof. Particularly preferably, the third inorganic oxide is alumina, lanthanum-alumina, zirconia, or a magnesia/alumina composite oxide. One especially preferred third inorganic oxide is alumina or lanthanum-alumina.

The third OSC material and the third inorganic oxide can have a weight ratio of no greater than 10:1; preferably, no greater than 8:1 or 5:1; more preferably, no greater than 4:1 or 3:1; most preferably, no greater than 2:1.

Alternatively, the third OSC material and the third inorganic oxide can have a weight ratio of 10:1 to 1:10; preferably, 8:1 to 1:8 or 5:1 to 1:5; more preferably, 4:1 to 1:4 or 3:1 to 1:3; and most preferably, 2:1 to 1:2.

In some embodiments, the third OSC material and the third inorganic oxide can have a weight ratio of no less than 2:1. In further embodiments, the third OSC material and the third inorganic oxide can have a weight ratio of no less than 10:1. In another further embodiments, the third OSC material and the third inorganic oxide can have a weight ratio of no less than 20:1 or no less than 30:1. In yet another further embodiments, the third OSC material and the third inorganic oxide can have a weight ratio of no less than 40:1 or no less than 50:1.

The third catalytic region can extend for 100 percent of the axial length L (e.g., see FIGS. 4a-4d and 5a-5c).

The third catalytic region can be less than the axial length L, for example, no greater than 95%, 90%, 80%, or 70% of the axial length L (e.g., see FIGS. 6g-6l).

The second catalytic region can overlap with the first catalytic region for 0.1 to 99 percent of the axial length L (e.g., see FIGS. 6a-6a), the first catalytic region can overlie the second catalytic region, or the second catalytic region can overlie the first catalytic region). Alternatively, the either of second or first region can extend for 30 to 70 percent of the axial length L. Preferably, for 40 to 60 percent, more preferably, 45 to 55 percent of the axial length L. and most preferably, the total length of the second and the first region is equal or less than the axial length L (e.g., see FIGS. 4a-4d).

Substrate

Preferably the substrate is a flow-through monolith. Alternatively, the substrate can be a wall-flow filter.

The flow-through monolith substrate has a first face and a second face defining a longitudinal direction there between. The flow-through monolith substrate has a plurality of channels extending between the first face and the second face. The plurality of channels extends in the longitudinal direction and provide a plurality of inner surfaces (e.g. the surfaces of the walls defining each channel). Each of the plurality of channels has an opening at the first face and an opening at the second face. For the avoidance of doubt, the flow-through monolith substrate is not a wall flow filter.

The first face is typically at an inlet end of the substrate and the second face is at an outlet end of the substrate.

The channels may be of a constant width and each plurality of channels may have a uniform channel width.

Preferably within a plane orthogonal to the longitudinal direction, the monolith substrate has from 300 to 900 channels per square inch, preferably from 400 to 800. For example, on the first face, the density of open first channels and closed second channels is from 600 to 700 channels per square inch. The channels can have cross sections that are rectangular, square, circular, oval, triangular, hexagonal, or other polygonal shapes.

The monolith substrate acts as a support for holding catalytic material. Suitable materials for forming the monolith substrate include ceramic-like materials such as cordierite, silicon carbide, silicon nitride, zirconia, mullite, spodumene, alumina-silica magnesia or zirconium silicate, or of porous, refractory metal. Such materials and their use in the manufacture of porous monolith substrates are well known in the art.

It should be noted that the flow-through monolith substrate described herein is a single component (i.e. a single brick). Nonetheless, when forming an emission treatment system, the substrate used may be formed by adhering together a plurality of channels or by adhering together a plurality of smaller substrates as described herein. Such techniques are well known in the art, as well as suitable casings and configurations of the emission treatment system.

In embodiments wherein the catalyst article of the present comprises a ceramic substrate, the ceramic substrate may be made of any suitable refractory material, e.g., alumina, silica, ceria, zirconia, magnesia, zeolites, silicon nitride, silicon carbide, zirconium silicates, magnesium silicates, aluminosilicates and metallo aluminosilicates (such as cordierite and spodumene), or a mixture or mixed oxide of any two or more thereof. Cordierite, a magnesium aluminosilicate, and silicon carbide are particularly preferred.

In embodiments wherein the catalyst article of the present invention comprises a metallic substrate, the metallic substrate may be made of any suitable metal, and in particular heat-resistant metals and metal alloys such as titanium and stainless steel as well as ferritic alloys containing iron, nickel, chromium, and/or aluminum in addition to other trace metals.

Another aspect of the present disclosure is directed to a method for treating a vehicular exhaust gas containing NO$_x$, CO, and HC using the catalyst article described herein. Catalytic converters equipped with the TWC made according to this method show improved catalytic properties compared to conventional TWC (with the same PGM loading), also show especially improved performance under DFSO conditions (e.g., see Examples and Table 5).

Another aspect of the present disclosure is directed to a system for treating vehicular exhaust gas comprising the catalyst article described herein in conjunction with a conduit for transferring the exhaust gas through the system. In some embodiments, the catalyst article described herein can be located on the outlet of a close-coupled TWC. In other embodiments, the catalyst article described herein can be located on an underbody TWC.

Definitions

The term "region" as used herein refers to an area on a substrate, typically obtained by drying and/or calcining a washcoat. A "region" can, for example, be disposed or supported on a substrate as a "layer" or a "zone". The area or arrangement on a substrate is generally controlled during the process of applying the washcoat to the substrate. The "region" typically has distinct boundaries or edges (i.e. it is possible to distinguish one region from another region using conventional analytical techniques).

Typically, the "region" has a substantially uniform length. The reference to a "substantially uniform length" in this context refers to a length that does not deviate (e.g. the difference between the maximum and minimum length) by more than 10%, preferably does not deviate by more than 5%, more preferably does not deviate by more than 1%, from its mean value.

It is preferable that each "region" has a substantially uniform composition (i.e. there is no substantial difference in the composition of the washcoat when comparing one part of the region with another part of that region). Substantially uniform composition in this context refers to a material (e.g., region) where the difference in composition when comparing one part of the region with another part of the region is 5% or less, usually 2.5% or less, and most commonly 1% or less.

The term "zone" as used herein refers to a region having a length that is less than the total length of the substrate, such as ≤75% of the total length of the substrate. A "zone" typically has a length (i.e. a substantially uniform length) of at least 5% (e.g. ≥5%) of the total length of the substrate.

The total length of a substrate is the distance between its inlet end and its outlet end (e.g. the opposing ends of the substrate).

Any reference to a "zone disposed at an inlet end of the substrate" used herein refers to a zone disposed or supported on a substrate where the zone is nearer to an inlet end of the substrate than the zone is to an outlet end of the substrate. Thus, the midpoint of the zone (i.e. at half its length) is nearer to the inlet end of the substrate than the midpoint is to the outlet end of the substrate. Similarly, any reference to a "zone disposed at an outlet end of the substrate" used herein refers to a zone disposed or supported on a substrate where the zone is nearer to an outlet end of the substrate than the zone is to an inlet end of the substrate. Thus, the midpoint of the zone (i.e. at half its length) is nearer to the outlet end of the substrate than the midpoint is to the inlet end of the substrate.

When the substrate is a wall-flow filter, then generally any reference to a "zone disposed at an inlet end of the substrate" refers to a zone disposed or supported on the substrate that is:

(a) nearer to an inlet end (e.g. open end) of an inlet channel of the substrate than the zone is to a closed end (e.g. blocked or plugged end) of the inlet channel, and/or (b) nearer to a closed end (e.g. blocked or plugged end) of an outlet channel of the substrate than the zone is to an outlet end (e.g. open end) of the outlet channel.

Thus, the midpoint of the zone (i.e. at half its length) is (a) nearer to an inlet end of an inlet channel of the substrate than the midpoint is to the closed end of the inlet channel, and/or (b) nearer to a closed end of an outlet channel of the substrate than the midpoint is to an outlet end of the outlet channel.

Similarly, any reference to a "zone disposed at an outlet end of the substrate" when the substrate is a wall-flow filter refers to a zone disposed or supported on the substrate that is:

(a) nearer to an outlet end (e.g. an open end) of an outlet channel of the substrate than the zone is to a closed end (e.g. blocked or plugged) of the outlet channel, and/or (b) nearer to a closed end (e.g. blocked or plugged end) of an inlet channel of the substrate than it is to an inlet end (e.g. an open end) of the inlet channel.

Thus, the midpoint of the zone (i.e. at half its length) is (a) nearer to an outlet end of an outlet channel of the substrate than the midpoint is to the closed end of the outlet channel, and/or (b) nearer to a closed end of an inlet channel of the substrate than the midpoint is to an inlet end of the inlet channel.

A zone may satisfy both (a) and (b) when the washcoat is present in the wall of the wall-flow filter (i.e. the zone is in-wall).

The term "washcoat" is well known in the art and refers to an adherent coating that is applied to a substrate usually during production of a catalyst.

The acronym "PGM" as used herein refers to "platinum group metal". The term "platinum group metal" generally refers to a metal selected from the group consisting of Ru, Rh, Pd, Os, Ir and Pt, preferably a metal selected from the group consisting of Ru, Rh, Pd, Ir and Pt. In general, the term "PGM" preferably refers to a metal selected from the group consisting of Rh, Pt and Pd.

The term "mixed oxide" as used herein generally refers to a mixture of oxides in a single phase, as is conventionally known in the art. The term "composite oxide" as used herein generally refers to a composition of oxides having more than one phase, as is conventionally known in the art.

The expression "consist essentially" as used herein limits the scope of a feature to include the specified materials or steps, and any other materials or steps that do not materially affect the basic characteristics of that feature, such as for example minor impurities. The expression "consist essentially of" embraces the expression "consisting of".

The expression "substantially free of" as used herein with reference to a material, typically in the context of the content of a region, a layer or a zone, means that the material in a minor amount, such as ≤5% by weight, preferably ≤2% by weight, more preferably ≤1% by weight. The expression "substantially free of" embraces the expression "does not comprise."

The expression "essentially free of" as used herein with reference to a material, typically in the context of the content of a region, a layer or a zone, means that the material in a trace amount, such as ≤1% by weight, preferably ≤0.5% by weight, more preferably ≤0.1% by weight. The expression "essentially free of" embraces the expression "does not comprise."

Any reference to an amount of dopant, particularly a total amount, expressed as a by weight as used herein refers to the weight of the support material or the refractory metal oxide thereof.

The term "loading" as used herein refers to a measurement in units of $g/ft^3$ on a metal weight basis.

The following examples merely illustrate the invention. Those skilled in the art will recognize many variations that are within the spirit of the invention and scope of the claims.

EXAMPLES

Comparative Catalyst 1

Comparative Catalyst 1 is a coated catalyst on a cordierite substrate, consisting of 4 $g/ft^3$ Rh, 2 $g/ft^3$ Pt, 1.0 $g/in^3$ La-stabilized alumina and 1.0 $g/in^3$ OSC material. The two PGM nitrate precursors were pre-mixed together, then hydrolyzed on La-stabilized alumina by adjusting pH to 6~7 with tetraethylammonium hydroxide (TEAOH). 100% Rh and Pt uptake were confirmed by analyzing the PGM concentrations in the supernatant. OSC slurry was added to the PGM and alumina slurry mentioned above, followed by thickening. The final WC was then coated on a cordierite substrate, dry and fired.

Inventive Catalyst 1

Inventive Catalyst 1 is a coated catalyst on a cordierite substrate, consisting of 4 $g/ft^3$ Rh, 2 $g/ft^3$ Pt, 1.0 $g/in^3$ $ZrO_2$—$Al_2O_3$ composite material with 10 wt % of $ZrO_2$ and 1.0 $g/in^3$ OSC material. The two PGM nitrate precursors were pre-mixed together, then hydrolyzed on $ZrO_2$—$Al_2O_3$ composite material by adjusting pH to 6~7 with TEAOH. 100% Rh and Pt uptake were confirmed by analyzing the PGM concentrations in the supernatant. OSC slurry was added to the PGM and $ZrO_2$—$Al_2O_3$ slurry mentioned above, followed by thickening. The final WC was then coated on a cordierite substrate, dry and fired.

Inventive Catalyst 2

Inventive Catalyst 1 is a coated catalyst on a cordierite substrate, consisting of 4 $g/ft^3$ Rh, 2 $g/ft^3$ Pt, 1.0 $g/in^3$ $ZrO_2$—$Al_2O_3$ composite material with 20 wt % of $ZrO_2$ and 1.0 $g/in^3$ OSC material. The two PGM nitrate precursors were pre-mixed together, then hydrolyzed on $ZrO_2$—$Al_2O_3$ composite material by adjusting pH to 6~7 with TEAOH. 100% Rh and Pt uptake were confirmed by analyzing the PGM concentrations in the supernatant. OSC slurry was added to the PGM and $ZrO_2$—$Al_2O_3$ slurry mentioned above, followed by thickening. The final WC was then coated on a cordierite substrate, dry and fired.

Inventive Catalyst 3

Inventive Catalyst 3 is a coated catalyst on a cordierite substrate, consisting of 4 $g/ft^3$ Rh, 2 $g/ft^3$ Pt, 1.0 $g/in^3$ $ZrO_2$—$Al_2O_3$ composite material with 45 wt % of $ZrO_2$ and 1.0 $g/in^3$ OSC material. The two PGM nitrate precursors were pre-mixed together, then hydrolyzed on $ZrO_2$—$Al_2O_3$ composite material by adjusting pH to 6~7 with TEAOH. 100% Rh and Pt uptake were confirmed by analyzing the PGM concentrations in the supernatant. OSC slurry was added to the PGM and $ZrO_2$—$Al_2O_3$ slurry mentioned above, followed by thickening. The final WC was then coated on a cordierite substrate, dry and fired.

TABLE 1

List of All Catalysts

| | $Al_2O_3$-based support material | Rh loading $g/ft^3$ | Pt loading $g/ft^3$ |
|---|---|---|---|
| Comparative Catalyst 1 | $La_2O_3$-stablized alumina | 4 | 2 |
| Inventive Catalyst 1 | 10% $ZrO_2$—$Al_2O_3$ | 4 | 2 |
| Inventive Catalyst 2 | 20% $ZrO_2$—$Al_2O_3$ | 4 | 2 |
| Inventive Catalyst 3 | 45% $ZrO_2$—$Al_2O_3$ | 4 | 2 |

Example 1: Simulated Deceleration Fuel Shutoff Test on Reactor

Before testing, all catalysts were hydrothermally aged at 1000° C. for 40 hours in a lab reactor under the stoic ageing with occasional lean spikes as described below with gas compositions in Table 2.

1. Ramp up with stoic gas mixture at 10° C./min to 1000° C. of inlet temperature.
2. Alternate between Stoic and Lean mode for 40 hours with 5 mins in Stoic gas and 1 min in Lean gas.
3. Cool down to <400° C. with the Rich gas mixture, then switch to N2 until room Temp.

TABLE 2

Gas Composition for the "stoic + lean spike" Ageing

| | CO % | $H_2$ % | $O_2$ % | $CO_2$ % | $H_2O$ % | λ | Duration |
|---|---|---|---|---|---|---|---|
| Lean | — | — | air | — | 10 | — | 5 mins |
| Stoic | 1.2 | 0.4 | 0.8 | 10 | 10 | 1.00 | 1 min |
| Rich | 2.4 | 0.8 | 0.8 | 10 | 10 | 0.955 | Cool down |

The deceleration fuel shut off (DFSO) events in typical transient testing cycles such as FTP75, US06, RDEmax, or WLTC have three common features of a) high spatial velocity, b) high temperature, and c) lambda swing from lean to rich for the inlet of close couple TWC brick but swing from lean to stoic for outlet of close couple TWC and underbody TWC.

During the simulated DFSO test, the gas flow rate was maintained at a spatial velocity of ~200,000/ hr. The catalyst inlet temperature was raised from 100° C. to 550° C. and maintained at the same temperature throughout the test. Once the inlet temperature reached 550° C., gas switching started according to the sequence listed in Table 3. The first half of test—"Rich recovery" session was designed to simulate the condition of the inlet of close couple TWC brick during the DFSO event. For example, the catalysts were exposed to 12% $O_2$ for 3 minutes to simulate the fuel cut event, when the combustion chamber of the engine is filled with air at fuel cut or engine shutout step. (Step 1) At this moment, Rh and the support materials in the catalysts were completely oxidized. Then, a $N_2$ gas flew through the catalysts to purge the $O_2$ (Step 2) followed by a rich gas flowing step to recover the Rh catalyst. (Step 3) After another $N_2$ gas flew, the above sequence (steps 1 to 3) was repeated. The second half of the simulated DFSO test— "Stoic recover" session, in contrast, was designed for simulating the conditions of the outlet of close couple TWC and underbody TWC. "Stoic recover" uses the same sequence as "Rich recovery" with the only difference of "stoic gas" flowing through the catalyst surface at catalyst regeneration step. Exhaust gases compositions at each step are listed in Table 4.

TABLE 3

Gas Switching Sequence of the Simulated DFSO Test

| Step | Gas composition | Duration | Session |
|---|---|---|---|
| 1 | 12% $O_2$ | 3 mins | Rich recovery |
| 2 | $N_2$ | 3 mins | |
| 3 | Rich | 3 mins | |
| 4 | $N_2$ | 3 mins | |
| 5 | 12% $O_2$ | 3 mins | |
| 6 | $N_2$ | 3 mins | |
| 7 | Rich | 3 mins | |
| 8 | $N_2$ | 3 mins | Purge |
| 9 | 12% $O_2$ | 3 mins | Stoic recovery |
| 10 | $N_2$ | 3 mins | |
| 11 | Stoic | 3 mins | |
| 12 | $N_2$ | 3 mins | |
| 13 | 12% $O_2$ | 3 mins | |
| 14 | $N_2$ | 3 mins | |
| 15 | Stoic | 3 mins | |

TABLE 4

Gas Compositions for the Simulated DFSO Test

| | $C_3H_6$ ppm as $C_1$ | Iso-$C_5H_{12}$ ppm as $C_1$ | CO % | $H_2$ % | NO ppm | $O_2$ % | $CO_2$ % | $H_2O$ % | $\lambda$ |
|---|---|---|---|---|---|---|---|---|---|
| Rich | 1080 | 120 | 2.28 | 0.17 | 2200 | 0.49 | 14 | 10 | 0.964 |
| Stoic | 1200 | — | 1.39 | 0.17 | 1000 | 0.885 | 14 | 10 | 0.999 |

In the catalyst performance testing, the $NO_x$, CO and THC slip at the end of Rich Recovery and Stoic Recovery stage were averaged, respectively. Results are shown in Table 5. The less the slip of the $NO_x$, CO and THC means the better performance as an exhaust gas purification catalyst, as it represents how fast the recovery of Rh to the metallic status, which is well-known for $NO_x$, CO and THC reduction. All Inventive Catalysts using $ZrO_2$—$Al_2O_3$ materials show much less $NO_x$ slip and THC slip than Comparative Catalyst 1. Among the three Inventive Catalysts, Inventive Catalyst 2 using 20% $ZrO_2$—$Al_2O_3$ is apparently better than the other two with the least among of $NO_x$ and THC slip. It is worth to mention that CO slips seem do not follow the same trend as $NO_x$ and THC slips. We use high concentrations of CO in both Rich Recovery (2.28%) and Stoic Recovery (1.39%) sessions. Mass flow controller (MFC) drifted from run to run, which caused the CO feed gas inconsistent. Overall, the CO conversion is about 99.5% or above for all catalysts, the difference in CO slips is negligible.

TABLE 5

Catalyst Emissions at Simulated DFSO Test after "Stoic + lean spike" ageing

| | Rich recovery ($\lambda$ = 0.964) | | | Stoic recovery ($\lambda$ = 0.999) | | |
|---|---|---|---|---|---|---|
| | $NO_x$ Slip (ppm) | THC slip (ppm) | CO slip (ppm) | $NO_x$ Slip (ppm) | THC slip (ppm) | CO slip (ppm) |
| Comparative Catalyst 1 | 30 | 143 | 12115 | 703 | 94 | 500 |

TABLE 5-continued

Catalyst Emissions at Simulated DFSO Test after "Stoic + lean spike" ageing

| | Rich recovery ($\lambda$ = 0.964) | | | Stoic recovery ($\lambda$ = 0.999) | | |
|---|---|---|---|---|---|---|
| | $NO_x$ Slip (ppm) | THC slip (ppm) | CO slip (ppm) | $NO_x$ Slip (ppm) | THC slip (ppm) | CO slip (ppm) |
| Inventive Catalyst 1 | 15 | 90 | 11710 | 641 | 29 | 222 |
| Inventive Catalyst 2 | 3 | 83 | 12317 | 605 | 25 | 147 |
| Inventive Catalyst 3 | 7 | 77 | 10995 | 641 | 29 | 147 |

Another set of catalysts were hydrothermally aged at 1050° C. for 40 hours in a lab reactor using TWC 4-mode redox ageing protocol as described below with gas compositions in Table 6:

1. Ramp up with stoic gas mixture at 10° C./min to 1050° C. of inlet temperature.
2. Switch gases between Stoic, Lean, Stoic, Rich mode for 40 hours with 5 mins in each mode.
3. Cool down to <400° C. with the Rich gas mixture, then switch to $N_2$ until room Temp.

TABLE 6

Simulated Gas Compositions for the 4-mode Redox Ageing Cycle

| | CO (%) | $H_2$ (%) | $O_2$ (%) | $CO_2$ (%) | $H_2O$ (%) | $\lambda$ | Duration |
|---|---|---|---|---|---|---|---|
| Stoic | 1.2 | 0.4 | 0.8 | 10 | 10 | 1 | 5 mins |
| Lean | 1.2 | 0.4 | 1.6 | 10 | 10 | 1.05 | 5 mins |
| Rich | 2.4 | 0.8 | 0.8 | 10 | 10 | 0.95 | 5 mins |

TWC 4-mode aged catalysts were tested at Simulated DFSO condition and emissions of $NO_x$, CO and THC are listed in Table 7. Benefits of all three inventive catalysts using $ZrO_2$—$Al_2O_3$ for control of $NO_x$THC/CO emissions are very clear compared to Comparative Catalyst 1. Among them, Inventive Catalyst 2 using 20% $ZrO_2$—$Al_2O_3$ is noticeably better than the other two with the least among of $NO_x$/THC/CO slips.

TABLE 7

Catalyst Emissions at Simulated DFSO test after 4 mode redox ageing

| | Rich recovery ($\lambda$ = 0.964) | | | Stoic recovery ($\lambda$ = 0.999) | | |
|---|---|---|---|---|---|---|
| | $NO_x$ Slip (ppm) | THC slip (ppm) | CO slip (ppm) | $NO_x$ Slip (ppm) | THC slip (ppm) | CO slip (ppm) |
| Comparative Catalyst 1 | 50 | 275 | 16000 | 654 | 118 | 1112 |
| Inventive Catalyst 1 | 10 | 147 | 16000 | 588 | 30 | 408 |
| Inventive Catalyst 2 | 5.3 | 127 | 15500 | 550 | 30 | 400 |
| Inventive Catalyst 3 | 33 | 160 | 15700 | 593 | 57 | 800 |

Example 2: Perturbed Light Off Test on Reactor

Perturbed light-off test was conducted on all aged catalysts using simulated exhaust gases having the composition shown in Table 8. Before the perturbed light-off test, the catalysts were pretreated in air at 700° C. for 10 minutes, then cool to 150° C. in air. During the perturbed light-off test, the gas flow rate was maintained at a spatial velocity of ~200,000/ hr. The catalyst inlet temperature was raised up from 150° C. to 700° C. at a constant rate of 30° C./min with the gas compositions perturbed between lean and rich conditions at 1 Hz.

TABLE 8

| | | | Simulated Gas Composition for the Perturbed Light-off Test | | | | | | |
|---|---|---|---|---|---|---|---|---|---|
| | $O_2$ % | CO % | $H_2$ % | $C_3H_8$ C1 ppm | $C_3H_6$ C1 ppm | $NO_x$ ppm | $CO_2$ % | $H_2O$ % | λ |
| Lean | 0.6 | 0 | 0 | 230 | 230 | 2200 | 14 | 10 | 1.035 |
| Rich | 0 | 1.1 | 0.33 | 230 | 230 | 2200 | 14 | 10 | 0.965 |

In the perturbed light-off testing, the temperature at which 50% of each of the $NO_x$CO/THC components was converted was evaluated as $T_{50}$. The lower the temperature at which 50% was converted means the better performance as an exhaust gas purification catalyst.

As shown in Table 9 below, there is no light-off performance merits of any inventive catalysts using $ZrO_2$—$Al_2O_3$ as substitution of La-alumina for the fact that $T_{50}$ of inventive catalysts are either close or higher than Comparative Catalyst 1.

TABLE 9

| | Catalytic Conversion Performance for Perturbed Light-off Test after "stoic + lean spike" ageing and 4-mode Redox ageing | | | | | |
|---|---|---|---|---|---|---|
| | Ageing 1 Stoic + lean spikes 1000° C./40 hrs | | | Ageing 2 4-mode Redox 1050° C./40 hrs | | |
| | $NO_x$ $T_{80}$ (° C.) | CO $T_{50}$ (° C.) | THC $T_{50}$ (° C.) | $NO_x$ $T_{80}$ (° C.) | CO $T_{50}$ (° C.) | THC $T_{50}$ (° C.) |
| Comparative Catalyst 1 | 323 | 387 | 421 | 369 | 522 | 527 |
| Inventive Catalyst 1 | 330 | 406 | 426 | 361 | 524 | 513 |
| Inventive Catalyst 2 | 325 | 430 | 426 | 361 | 540 | 513 |
| Inventive Catalyst 3 | 325 | 412 | 435 | 377 | 559 | 550 |

The deceleration fuel shut off (DFSO) events and cold start events (light-off) have completely different conditions and therefore different catalyst requirements. A good DFSO catalyst does not guarantee it is good for cold start emission control function. It is recommended that PtRh catalysts using $ZrO_2$—$Al_2O_3$ as support materials should be located in either outlet of close couple TWC or underbody TWC, rather than the inlet of close couple TWC which plays an essential role for cold start emission control.

We claim:

1. A catalytic article for treating exhaust gas comprising:
a substrate comprising an inlet end and an outlet end with an axial length L;

16 a first catalytic region comprising a first platinum group metal (PGM) component supported on a first support material; wherein the first support material comprises $ZrO_2$—$Al_2O_3$;
wherein the $ZrO_2$—$Al_2O_3$ contains 1-50 wt. % $ZrO_2$; and
wherein the first catalytic region is substantially free of alkaline-earth metal.

2. The catalytic article of claim 1, wherein the $ZrO_2$—$Al_2O_3$ contains 5-50 wt. % $ZrO_2$.

3. The catalytic article of claim 1, wherein the $ZrO_2$—$Al_2O_3$ further comprises La, Mn, Cu, Ti, or Ni.

4. The catalytic article of claim 1, wherein the first PGM component is selected from the group consisting of platinum, palladium, rhodium, and a mixture thereof.

5. The catalytic article of claim 4, wherein the first PGM component comprises Pt and Rh.

6. The catalytic article of claim 1, wherein the $ZrO_2$—$Al_2O_3$ is substantially free of Ce.

7. The catalytic article of claim 1, wherein the total PGM loading in the first catalytic region is up to 50 g/ft³.

8. The catalytic article of claim 1, wherein the first catalytic region further comprises a first oxygen storage capacity (OSC) material.

9. The catalytic article of claim 8, wherein the first OSC material is cerium oxide, a ceria-zirconia mixed oxide, an alumina-ceria-zirconia mixed oxide, or a combination thereof.

10. The catalytic article of claim 1, wherein the first catalytic region is essentially free of alkaline-earth metal.

11. The catalytic article of claim 1, further comprising a second catalytic region.

12. The catalytic article of claim 11, wherein the second catalytic region comprises a second PGM component.

13. The catalytic article of claim 11, wherein the second catalytic region further comprises a second OSC material and/or a second inorganic oxide.

14. The catalytic article of claim 13, wherein the second OSC material is cerium oxide, zirconium oxide, a ceria-zirconia mixed oxide, an alumina-ceria-zirconia mixed oxide or a combination thereof.

15. The catalytic article of claim 13, wherein the second inorganic oxide is selected from the group consisting of alumina, magnesia, silica, zirconia, lanthanum, cerium, neodymium, praseodymium, yttrium oxides, and mixed oxides or composite oxides thereof.

16. The catalytic article of claim 11, wherein the second catalytic region extends for the axial length L.

17. The catalytic article of claim 11, wherein the second catalytic region is supported/deposited directly on the substrate.

18. The catalytic article of claim 1, wherein the first catalytic region extends for the axial length L.

19. The catalytic article of claim 1, wherein the first catalytic region is supported/deposited directly on the substrate.

20. A system for treating vehicular exhaust gas comprising the catalytic article of claim 1.

* * * * *